Patented July 17, 1951

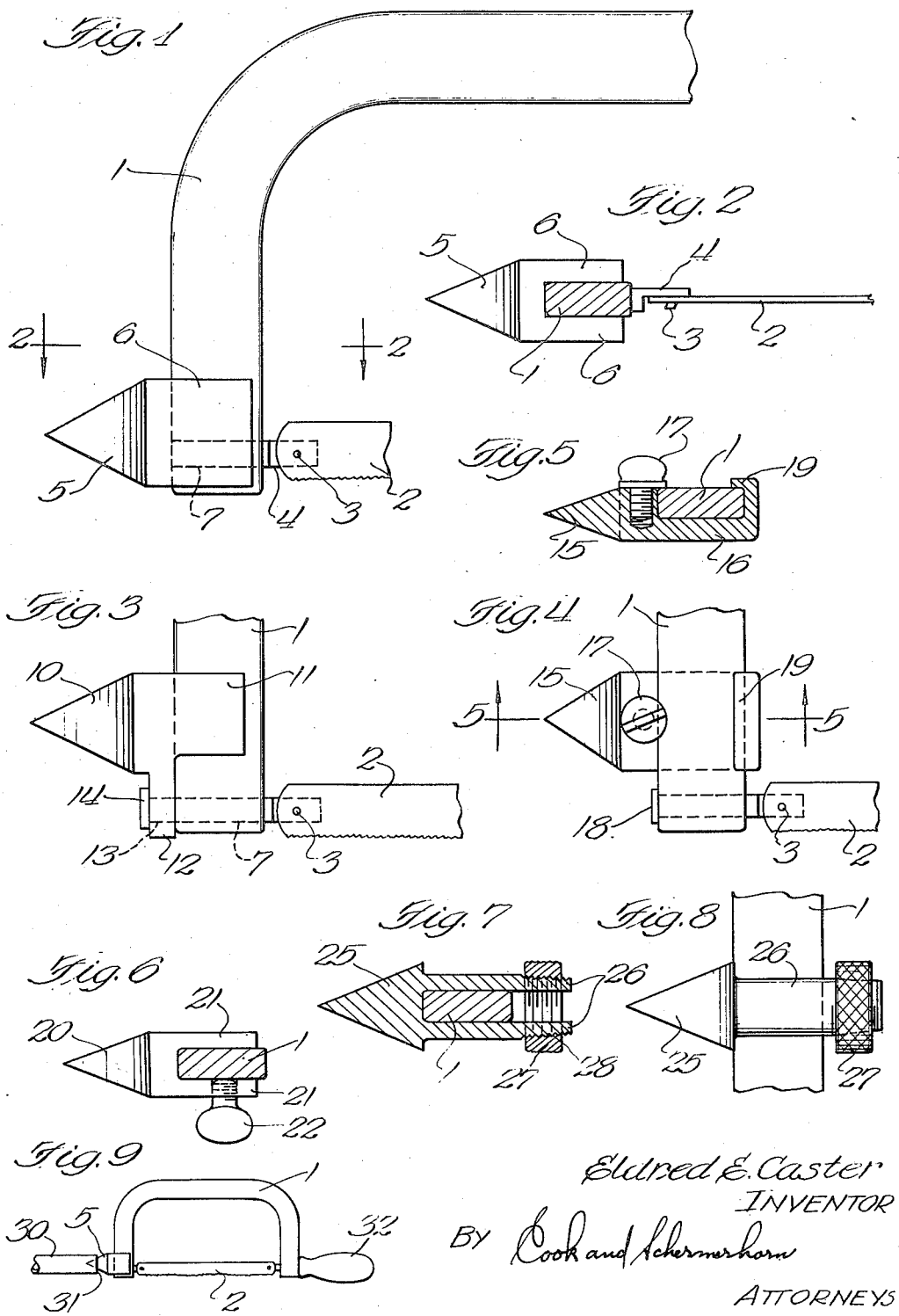

2,560,846

UNITED STATES PATENT OFFICE 2,560,846

REAMER ATTACHMENT FOR HACKSAWS

Eldred E. Caster, Tigard, Oreg.

Application May 22, 1946, Serial No. 671,539

5 Claims. (Cl. 7—13)

This invention relates to a combination tool for performing cutting and reaming operations, and has particular reference to a novel reamer bit adapted for mounting on the frame of a hacksaw and the like.

In cutting conduits and other tubular members with a hacksaw the saw teeth ordinarily leave a burr on the inside of the conduit which must be removed by a file or a reamer in order to prepare the conduit for its intended use. In soft material the cutting operation may also produce flattening of the tubing either by the action of the cutting instrumentality itself or by the vise or other tool with which the tubing is gripped while it is being cut. The flattened end of the tubing must then be rounded out to open it up to its full diameter to fulfill whatever purpose it is intended to serve, and various separate tools have heretofore been employed for cutting the conduit, for removing the internal burrs, and for rounding out the opening if the end has been flattened.

An object of the present invention is to provide a single combination tool for performing all these necessary operations incident to the cutting of conduits and tubing.

Another object is to provide a reamer attachment on a hacksaw frame so that after a conduit has been cut by the hacksaw blade the end of the conduit may be rounded out and relieved of burrs by means of the reamer.

Another object is to provide a reamer bit on a hacksaw frame substantially in line with the hacksaw handle and blade so that the hacksaw frame may be turned in the manner of a carpenter's brace to rotate the reamer bit.

A further object is to provide a reamer element which is adapted for mounting on a hacksaw frame in such a manner as to provide in itself the means for anchoring one end of the hacksaw blade.

A still further object is to provide a reamer bit designed and constructed for detachable mounting on a hacksaw frame without drilling or otherwise modifying such frame.

With the foregoing and other objects in view the invention resides in the combination of parts and in the details of construction hereinafter set forth in the following specification and appended claims, certain embodiments thereof being illustrated in the accompanying drawings in which:

Figure 1 is a fragmentary view of one embodiment of the present combination tool in which the reamer bit itself provides an anchor for a saw blade in a hacksaw frame;

Figure 2 is a sectional view taken on the line 2—2 of Figure 1;

Figure 3 is a fragmentary view of a modification in which the reamer bit is secured to the hacksaw frame by the pin which anchors the saw blade;

Figure 4 shows a modification in which the reamer bit is clamped on the hacksaw frame independently of the saw blade;

Figure 5 is a sectional view taken on the line 5—5 of Figure 4;

Figure 6 is a sectional view showing another modification in which the reamer bit is removably clamped on the hacksaw frame by means of a thumb screw;

Figures 7 and 8 are elevational and sectional views showing still another modification in which the reamer bit is clamped on the hacksaw frame independently of the saw blade; and Figure 9 illustrates the manner of using the reamer.

In the various modifications shown on the drawing a reamer bit is mounted in different ways upon a hacksaw frame so that the latter will not only serve as a handle for the reamer but more advantageously so that the generally D-shaped frame of the hacksaw may be turned with the leverage of a carpenter's brace to impart an oscillating rotary motion to the bit. In order to operate in this manner the reamer bit is preferably mounted substantially in line with the saw blade as the latter is ordinarily strung across the arms of the hacksaw frame in the manner of a bow string, whereby the handle of the hacksaw frame is also substantially in line with the axis of the reamer bit to guide the reamer bit and to force it into the conduit or tube end to be reamed out. With the reamer bit in this position the D-shaped frame of the hacksaw is thereby sufficiently offset from the axis of rotation of the reamer to provide leverage for turning the reamer in addition to the twisting effort which may be applied to the handle.

In Figure 1 the numeral 1 designates such a hacksaw frame of generally D-shape which is designed to tension a hacksaw blade 2 across the arms of the D. The outer end of the blade 2 shown in Figures 1 and 2 is equipped with a small hole which hooks over a projection 3 on a pin 4 extending from the reamer bit 5. The base of the reamer bit 5 comprises a pair of legs 6 which straddle the frame 1 in the manner shown with the pin 4 passing through the usual hole 7 provided in the frame for the anchor pin for the hacksaw blade. In this way both the hacksaw blade and the reamer bit are immovably anchored to the frame 1 by reason of the pin 4 extending through the hole 7 and the legs 6 engaging the frame member 1 on either side, the tension applied to the saw blade by the frame causing the reamer bit to seat firmly against the outer edge of the frame.

If the frame is of the type having an enlargement around the hole 7, the legs 6 may be formed to fit such enlargement or they may be cut away or relieved in the region of the enlargement so that they will engage the opposite sides of the frame only at points remote from the pin 4. It will be noted that the pin 4 is slightly offset from the center line axis of the bit 5 to provide the desired width of bit, and this eccentricity may be still further increased without impairing its utility if the enlargement about the hole 7 is too wide to be received between the legs 6, inasmuch as the bit is supported primarily by its seating engagement on the edge of the frame and by the tension exerted upon the pin 4. The principal purpose of the legs 6 is to prevent the bit from twisting or wobbling on the frame and this purpose may be fulfilled just as effectively by placing the legs remote from the pin 4.

The other end of the blade 2 is anchored in the other arm of the frame 1, and it is usually at this point of anchorage that the handle is attached. Thus, the handle, the blade 2, and the bit 5 are substantially aligned as shown in Figure 9 to define an axis of rotation in a reaming operation with the frame 1 offset in a convenient position to be oscillated back and forth to rotate the reamer. This reaming technique may be easily accomplished by holding the hacksaw handle in one hand and oscillating the frame 1 with the other hand as in turning a reamer bit in the ordinary carpenter's brace. When less turning effort is required the tool may be rotated with one hand in the manner of a screw driver.

Figure 3 illustrates a modification in which the reamer bit 10 is offset from the line of tension of the hacksaw blade 2. The bit 10 seats on the edge of the frame 1 with a pair of legs 11 straddling the frame member, and a shoulder 12 having an opening 13 adapted to overlie the hole 7 to receive the anchor pin 14 for the saw blade 2. If the shoulder 12 is made relatively thin, the usual anchor pin 14 may be inserted therethrough by merely springing the arms of the frame 1 together a little closer than usual or a longer pin may be used. In this arrangement the reamer bit 10 is offset from alignment with the handle of the hacksaw, but the amount of eccentricity is not sufficient to prevent the use of the tool in the manner previously described inasmuch as the nature of the reaming operation to be performed does not call for precision in the alignment of the turning axis. The distance the legs 11 are offset from the pin 14 is sufficient to place them beyond any enlargement in the frame around the hole 7 so that the reamer does not have to be made to fit such enlargement. In this modification the pin 14 may also be made a part of the bit 10 either by forming it integrally therewith or by making it as a separate piece and anchoring it permanently in the opening 13 as, for instance, by brazing or welding, or by making a driving fit.

In the modification shown in Figures 4 and 5 the reaming bit 15 has a single leg 16 overlying one side of the frame 1 and clamped thereagainst by means of a flanged thumbscrew 17. This manner of attachment is then independent of the hacksaw blade anchor pin 18 which is of conventional form. The bit 15 is made secure in its position by a hook end 19 which wraps around the edge of the frame member 1 so as to embrace a portion of the side face engaged by the head of the thumb screw in the manner shown.

In the embodiment shown in Figure 6 the reamer bit 20 straddles the frame 1 with a pair of legs 21, one of which carries a thumb screw 22 for clamping the bit on the frame. This mounting is spaced from the hacksaw blade as in Figure 4 so as to be independent of the anchor pin 18 which is of conventional form.

Figures 7 and 8 illustrate a modification wherein the reamer bit 25 is provided with a pair of resilient integral legs 26 clamped on the frame 1 by a nut 27. The legs 26 are flat on their inner sides to engage opposite sides of the frame and have end portions constituting cylindrical segments threaded at 28 to receive the nut, the dimensions of the parts being such that when the nut is tightened on the threads the legs 26 are drawn together in tight clamping engagement with the frame to hold the bit securely in place. The legs 26 may be relatively wide and flat between the threaded ends 28 and the bit head 25, or they may comprise cylindrical segments having the same shape and cross section as the threaded ends. In the latter case the legs 26 may resemble a slotted bolt, with the frame 1 received in the slot and seated against the bit end 25 which, in effect, constitutes the head of the bolt. The bit is independent of the saw blade and may be clamped at any point upon the frame 1, but is preferably attached close to the saw blade so as to be substantially in alignment with the hacksaw handle.

In all embodiments of the device the attachment of the reamer bit is accomplished without drilling or otherwise weakening or modifying the hacksaw frame, so that if it is desired to remove the reamer the hacksaw may be restored to its original condition without any alteration whatsoever. In the embodiments of Figures 1 and 3 the reamer bit is held in place by the tension of the hacksaw blade, and in the embodiments of Figures 4 to 8 the reamer attachment is independent of the saw blade. Still other forms of construction and means of attachment may be used, and all modifications within the scope of the appended claims are included in the invention.

The manner of using the reamer is illustrated in Figure 9. In this view the hollow conduit or tube 30 has an end 31 which has just been cut by the hacksaw blade 2, so as to leave an objectionable internal burr. By means of the handle 32 in substantial alignment with the reamer bit 5 the latter may be forced into the end of the conduit and rotated with one hand for very light work, or if greater effort is required a thrust may be applied through handle 32 while an oscillatory rotary motion is imparted to the frame 1 by the other hand. This manner of manipulation is just as effective with the bits 10, 15, 20, and 25 as with the bit 5. In this way the present combination tool effectively serves the purpose of two tools without adding substantially to the weight or size of the hacksaw itself. The reamer is always conveniently available for use after a sawing operation, and the arrangement of the parts does not subject the present tool to the usual objection to combination tools wherein one part interferes with the utility of another part.

In the present tool the reamer and hacksaw are of mutual assistance in expediting the treatment of conduits and tubing, but the efficiency of neither tool is reduced by the presence of the other. The D-shape of the hacksaw frame makes it particularly suitable for operating a reamer.

Having now described my invention and in what manner the same may be used, what I claim as new and desire to protect by Letters Patent is:

1. In a hacksaw, a blade tensioning frame member, an anchor pin passing through said frame member, a reamer bit secured to said frame member by one end of said anchor pin, and means on the other end of said anchor pin for attaching a saw blade thereto.

2. In a reamer bit for a hacksaw frame member of rectangular cross section, a bifurcated base adapted to seat upon and straddle said frame member, and an anchor pin engageable through said frame member for connecting a hacksaw blade in said frame and said bit.

3. In a reamer bit, a bifurcated base having legs adapted to overlie opposite sides of a hacksaw frame member, and an anchor pin carried by said base and engageable through said frame member for attaching a hacksaw blade to said reamer bit.

4. In a reamer bit, a bifurcated base having legs adapted to overlie opposite sides of a hacksaw frame, and a hacksaw blade anchor pin carried by said base in a plane between said legs to extend through said frame for anchoring a hacksaw blade.

5. A reamer bit for mounting on a hacksaw frame member of rectangular cross section, said bit having a base with two parallel spaced walls and a perpendicular wall therebetween to fit three sides of said rectangular frame member, and a member extending from said base parallel with said parallel walls for securing said base on said frame.

ELDRED E. CASTER.

REFERENCES CITED

The following references are of record in the file of this patent:

UNITED STATES PATENTS

| Number | Name | Date |
|---|---|---|
| 152,198 | Wakefield | June 16, 1874 |
| 585,329 | Neal | June 29, 1897 |
| 643,040 | Carvin et al. | Feb. 6, 1900 |
| 731,719 | Thiollier | June 23, 1903 |
| 755,924 | O'Shaugnessy | Mar. 29, 1904 |
| 774,039 | Carpenter | Nov. 1, 1904 |
| 778,753 | Link et al. | Dec. 27, 1904 |
| 881,298 | Chappel | Mar. 10, 1908 |
| 901,395 | Smith | Oct. 20, 1908 |
| 1,049,124 | Merriam | Dec. 31, 1912 |
| 2,242,873 | Thompson | May 20, 1941 |

FOREIGN PATENTS

| Number | Country | Date |
|---|---|---|
| 420,016 | France | Sept. 3, 1910 |